USC005535064A

United States Patent [19]
Nagasawa et al.

[11] Patent Number: 5,535,064
[45] Date of Patent: Jul. 9, 1996

[54] INFORMATION SIGNAL RECORDING SYSTEM USING DIFFERENT COMPRESSING METHODS TO OBTAIN SIGNALS FOR RECORDING ALONG WITH A CORRESPONDING SIGNAL INDICATING THE METHOD OF COMPRESSION

[75] Inventors: Kenichi Nagasawa; Tadayoshi Nakayama; Koji Takahashi; Masahiro Takei, all of Kanagawa-ken, Japan

[73] Assignee: Canon Kabushiki Kaisha, Tokyo, Japan

[21] Appl. No.: 395,297

[22] Filed: Feb. 27, 1995

Related U.S. Application Data

[62] Division of Ser. No. 27,869, Mar. 8, 1993, abandoned, which is a continuation of Ser. No. 798,035, Nov. 20, 1991, Pat. No. 5,198,940, which is a continuation of Ser. No. 625,627, Dec. 5, 1990, abandoned, which is a continuation of Ser. No. 434,532, Nov. 8, 1989, abandoned, which is a continuation of Ser. No. 258,120, Oct. 12, 1988, abandoned, which is a continuation of Ser. No. 881,823, Jul. 3, 1986, abandoned.

[30] Foreign Application Priority Data

Jul. 4, 1985 [JP] Japan .................................. 60-148111

[51] Int. Cl.[6] .................................................. H04N 5/78
[52] U.S. Cl. ...................... 360/9.100; 360/22; 358/335; 358/310
[58] Field of Search ................................ 360/8, 9.1, 10.1, 360/10.3, 22, 24, 18, 61, 27; 358/335, 906, 909, 310

[56] References Cited

U.S. PATENT DOCUMENTS

| | | | |
|---|---|---|---|
| 4,104,683 | 8/1978 | Granger | 360/9.1 |
| 4,496,995 | 1/1985 | Colles et al. | 360/9.1 |
| 4,611,250 | 9/1986 | Yoshinaka et al. | 360/9.1 |
| 4,685,002 | 8/1987 | Powers | 360/9.1 |
| 5,198,940 | 3/1993 | Nagasawa et al. | 360/9.1 |

*Primary Examiner*—Andrew L. Sniezek
*Attorney, Agent, or Firm*—Robin, Blecker, Daley & Driscoll

[57] ABSTRACT

An information signal recording system arranged to divide original information signals into signal groups, each bearing a predetermined amount of information, to have a plurality of compressing modes for different information compressing ratios and to compress the information signals of each group in one of the different compressing ratios in recording these signals on a tape-shaped magnetic recording medium comprises first compressed information signal forming assembly which operates on all these groups to form and produce a first compressed information signal consisting of only the information signals of a specific part of each of these groups; second compressed information signal forming assembly which operates on some of these groups to form and produce a second compressed information signal consisting of information signals of each groups excluding the information signals of the specific part; a magnetic head which records signals on the tape-shaped magnetic recording medium by tracing the medium in a direction of crossing the longitudinal direction of the medium; and supply assembly for supplying the magnetic head with the first and second compressed information signals by switching them from one over to the other at every half of the medium tracing period of the magnetic head.

16 Claims, 5 Drawing Sheets

INFORMATION SIGNAL RECORDING SYSTEM USING DIFFERENT COMPRESSING METHODS TO OBTAIN SIGNALS FOR RECORDING ALONG WITH A CORRESPONDING SIGNAL INDICATING THE METHOD OF COMPRESSION

This is a divisional of application Ser. No. 08/027,869, filed Mar. 8, 1993, now abandoned; which is a continuation of Ser. No. 07/798,035, filed Nov. 20, 1991, now U.S. Pat. No. 5,198,940; which is a continuation of Ser. No. 07/625,627, filed Dec. 5, 1990, now abandoned; which is a continuation of Ser. No. 07/434,532, filed Nov. 8, 1989, now abandoned; which is a continuation of Ser. No. 07/258,120, filed Oct. 12, 1988, now abandoned; which is a continuation of Ser. No. 06/881,823, filed Jul. 3, 1986, now abandoned.

BACKGROUND OF THE INVENTION

1. Field of the Invention

This invention relates to an information signal recording system for recording information signals.

2. Description of the Related Art

Various methods of recording information signals by compressing them have been developed during recent years for recording in a highly dense state such information signals that abound with information such as picture information signals. The known information signal compressing methods include a method called time-axis transformation system (hereinafter referred to as TAT system). The TAT system operates on a principle which is as shown in FIG. 1 of the accompanying drawings. Referring to FIG. 1, an original signal is divided into groups to have each contain a predetermined amount of information as indicated by broken lines. A discrimination is made between denseness and sparseness of information included in each of these groups. For a group which is determined to be dense, all the data obtained by sampling the original signal is transmitted as transmission data. For a group determined to be sparse, only a portion of all the data is transmitted as transmission data while the rest is not transmitted and is processed as thinned-out data.

Therefore, the number of data to be transmitted per unit time decreases. The transmission signal is compressed band-wise from the original signal. The information signal is thus compressed before transmission. After transmission, the signal is restored to the original state of signal on the basis of the data transmitted. In restoring the original signal, interpolation data is obtained by proximately reproducing the thinned-out data using the transmitted data. The interpolation data is positioned in place of the sparse parts and thus closely resembles the thinned-out data. Therefore, information can be transmitted without being deteriorated from its original state despite of the transmission band which is greatly compressed as compared with a band otherwise necessary for transmission of the whole data.

Each group is examined for the denseness or sparseness of information carried by the original signal in determining whether the group is to be transmitted in a whole data transmitting mode or in a partial data transmitting mode. Then, information on the result of this determination is also transmitted as a transmission mode information signal.

It is conceivable that the information-signal compression method mentioned above can be advantageously applied to magnetic recording and reproduction of compressed information signals. However, if a transmission mode information signal for determining the above-stated transmission mode either becomes erroneous or erased due to a drop-out or the like in a recording and reproducing system, it becomes no longer possible to restore the information signal to its original state. After occurrence of such an error, the information signal remains unrestorable unless the transmission mode information signal is synchronized with the transmission data. Further, in that event, since the signal reproduced remains invalid as it differs from the original signal until completion of the synchronizing process, frequent occurrence of errors in the transmission mode information signal would render the whole recorded information meaningless.

SUMMARY OF THE INVENTION

This invention is directed to the solution of the above-stated problem of the prior art. It is therefore an object of this invention to provide an information signal recording system which is capable of adequately restoring signals into their original state even in cases where the above-stated transmission mode information signal which is indicative of a transmission mode either becomes erroneous or is erased.

It is another object of this invention to provide an information signal recording system which is capable of recording an information signal in such a way as to permit adequate restoration of the signal to the original state without recourse to the use of a transmission mode information signal for discriminating a transmission mode.

Under this object, an information signal recording system arranged as an embodiment of this invention to divide original information signals into signal groups, each bearing a predetermined amount of information, to have a plurality of compressing modes for different information compressing ratios and to compress the information signal of each group in one of the different compressing ratios in recording these signals on a tape-shaped magnetic recording medium comprises first compressed information signal forming means which operates on all these groups to form and produce a first compressed information signal consisting of only the information signals of a specific part of each of these groups; second compressed information signal forming means which operates on some of these groups to form and produce a second compressed information signal consisting of information Signals of each group excluding the signals of the specific part; a magnetic head which records signals on the tape-shaped magnetic recording medium by tracing the medium in a direction of crossing the longitudinal direction of the medium; and supply means for supplying the magnetic head with the first and second compressed information signals by switching them from one over to the other at every half of the medium tracing period of the magnetic head.

The above and further objects and features of this invention will become apparent from the following detailed description of embodiments thereof taken in connection with the accompanying drawings.

DETAILED DESCRIPTION OF THE PREFERRED EMBODIMENT

Figure 1:
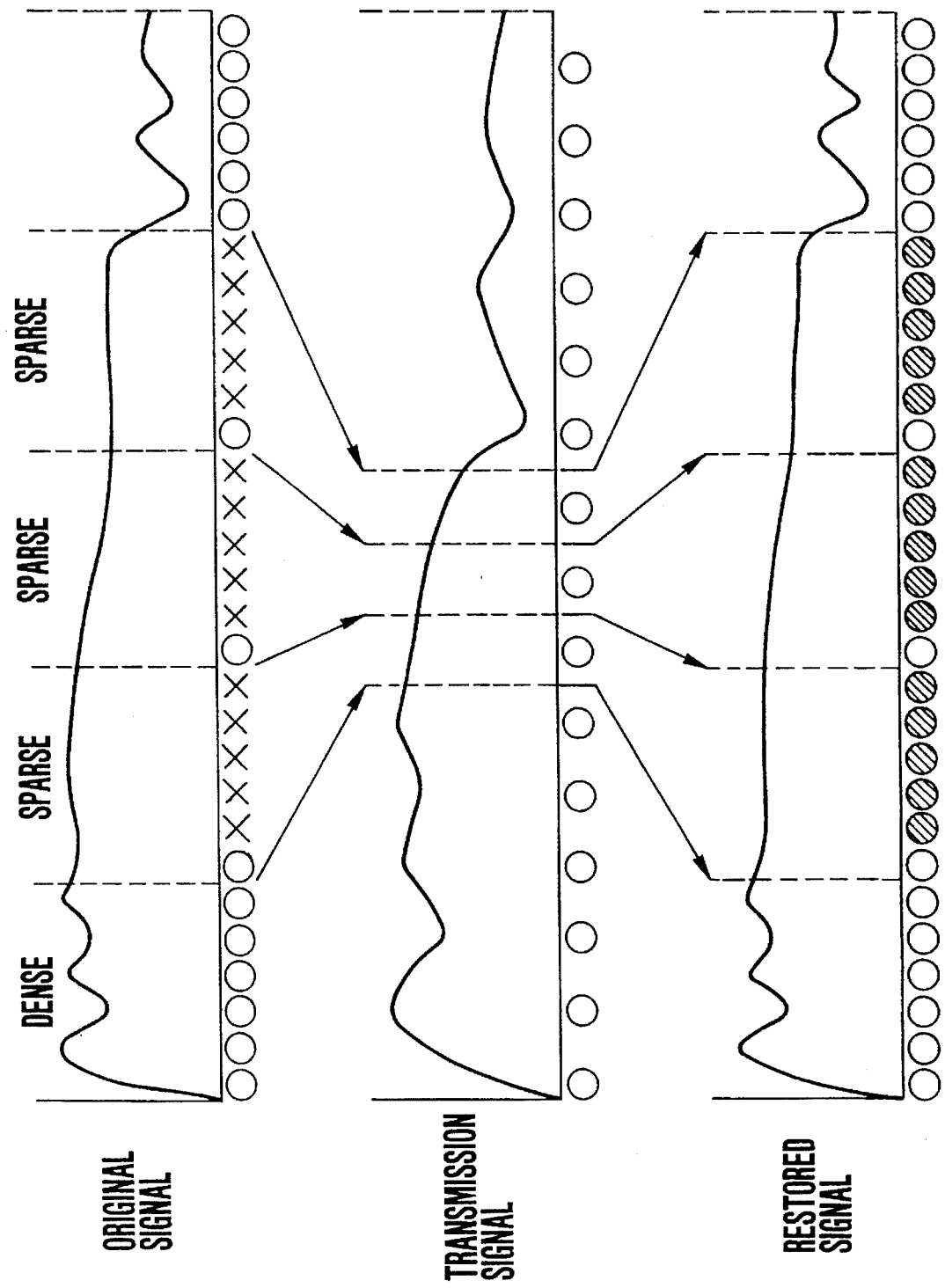
FIG. 1 is an illustration of the operating principle of the conventional TAT (time-axis transformation) system.
Figure 2:
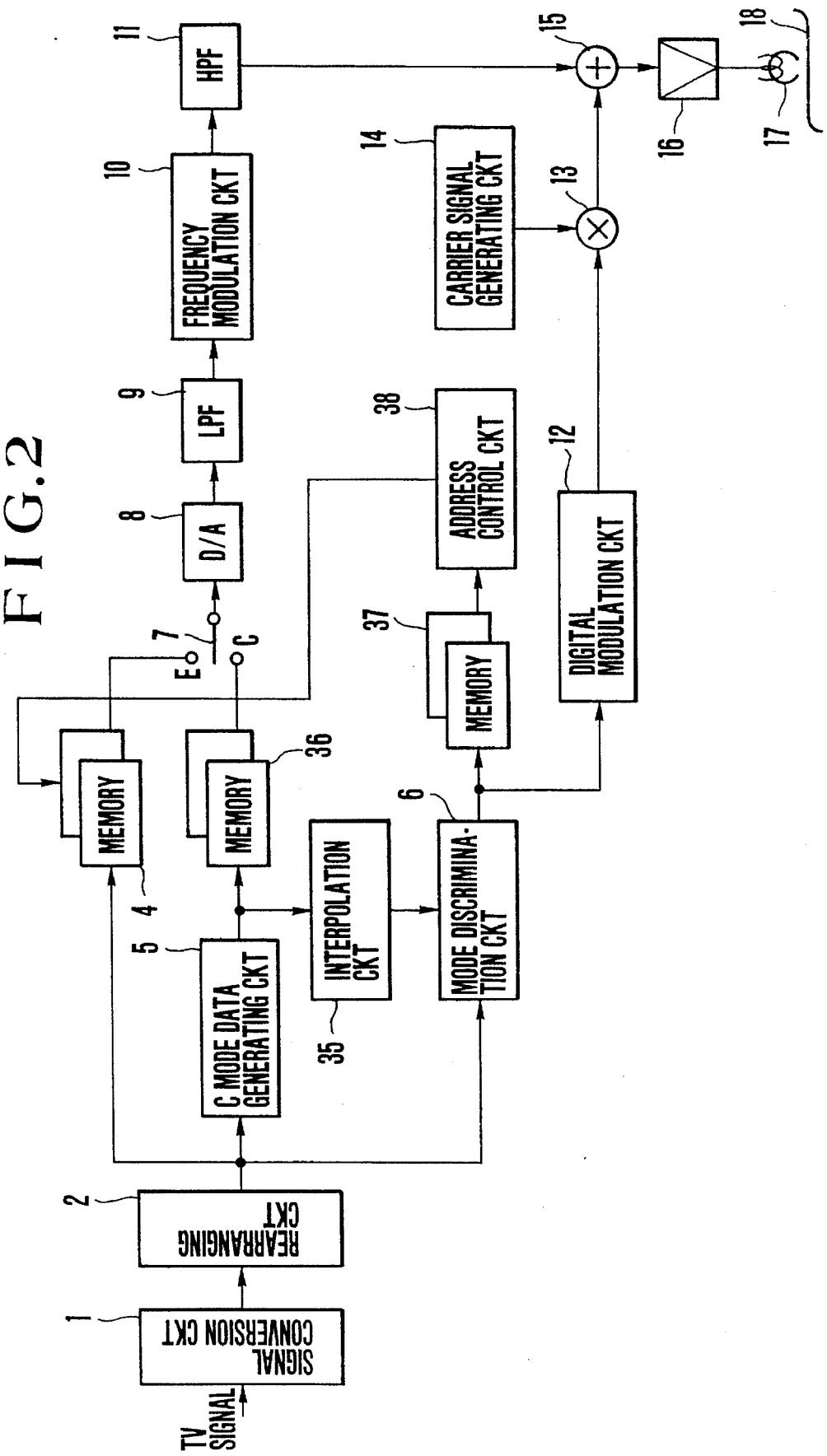
FIG. 2 is a block diagram showing in outline the recording system of an information signal recording system arranged as an embodiment of this invention.
Figure 3:
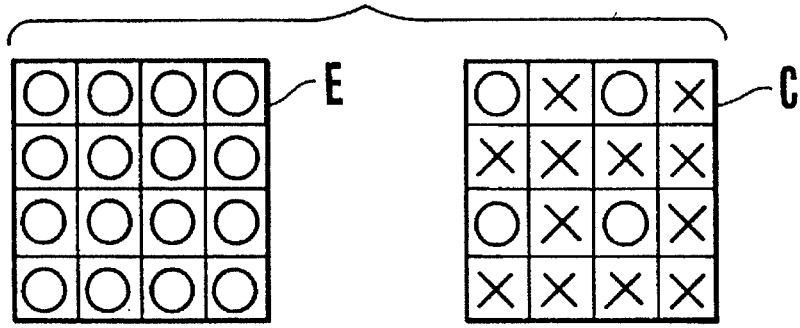
FIG. 3 is an illustration of the information signal compressing operation of the information signal recording system shown in FIG. 2.

In an embodiment given here, this invention is applied to a TV signal recording and reproducing system. FIG. 2 shows in outline the recording system of the recording and reproducing system arranged as the embodiment of this invention. An incoming TV signal is converted by a signal conversion circuit 1 into picture element data suited for compression of an information signal. The picture element data thus obtained is rearranged by a rearranging circuit 2 into data arrangement suited for compression. The rearranged picture element data is then subjected to an information signal compressing process which is performed in a manner as described below:

FIG. 3 is an illustration of an information signal compressing process for a picture element block which is obtained by dividing one picture plane into many blocks. In FIG. 3, a symbol "O" denotes transmission data and another symbol "X" thinned-out data respectively. A part E of FIG. 3 shows a data transmission mode in which the information signal is not compressed. Another part C shows a data transmission mode in which the information signal is compressed for data transmission. Hereinafter these two different data transmission modes will be called the mode E and the mode C respectively. As apparent from the illustration, the data is compressed for transmission in the mode C to an extent of ¼ of the mode E. In thinning out data in the vertical and horizontal directions of the picture plane within each of the divided picture element blocks, each block must be correlated with other blocks located adjacent thereto.

Figure 4A:
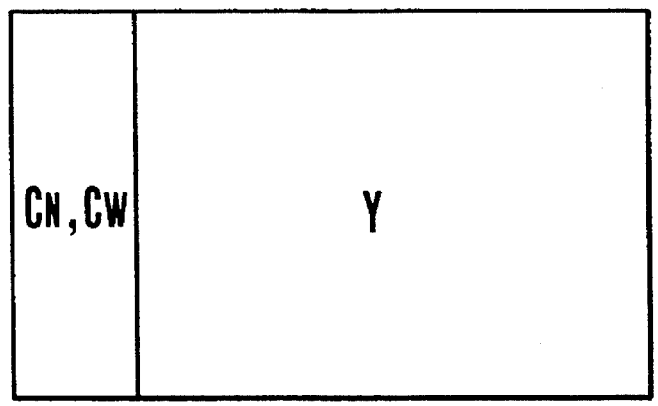
FIGS. 4(A) and 4(B) schematically show the forms of signals processed by the information signal recording system of FIG. 2.
Figure 4B:
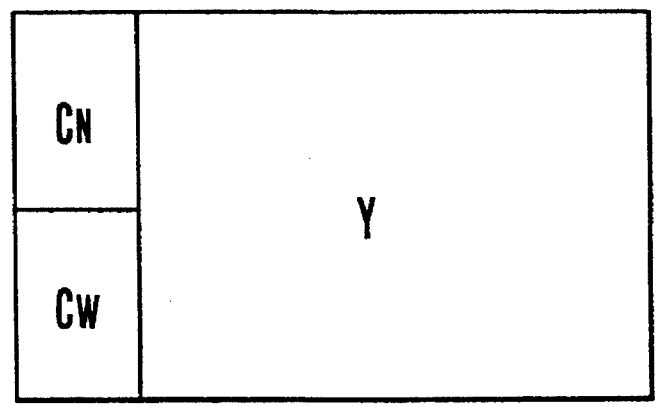

To meet this requirement, the signal conversion circuit 1 and the rearranging circuit 2 of FIG. 2 are arranged to perform the following processes: referring to FIGS. 4(A) and 4(B), the incoming TV signal has the picture element data of line sequential color difference signals CN and CW arranged within a ⅕ part in the first half of each horizontal scanning period. Meanwhile, the picture element data of a luminance signal Y is arranged in a ⅘ part in the latter half of the horizontal scanning period. FIG. 4(A) schematically shows this signal arrangement as a reproduced picture plane. Further, the rearranging circuit 2 is arranged to read out the picture element data by using a field memory or the like in such a way as to arrange the color difference signals CN and CW to have positional correlativity also in the vertical direction. FIG. 4(B) schematically shows the signal arrangement thus obtained.

Figure 5:
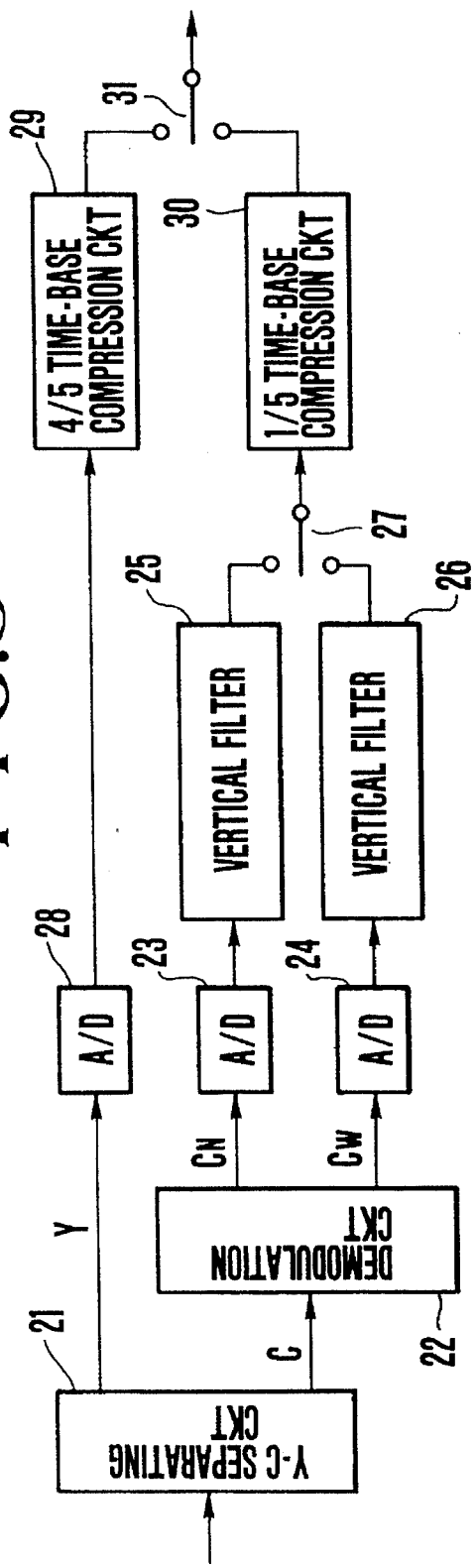
FIG. 5 is a block diagram showing by way of example the arrangement of a signal conversion circuit included in the information signal recording system of FIG. 2.

FIG. 5 shows by way of example the arrangement of the signal conversion circuit 1 of FIG. 2. A TV signal which is an NTSC signal is first supplied to a Y-C separating circuit 21. The circuit 21 separates a luminance signal Y and a chrominance signal C from each other. The chrominance signal C is converted by a demodulation circuit 22 into two color difference signals CN and CW. The color difference signals CN and CW are supplied respectively via analog-to-digital (A/D) converters 23 and 24 to vertical filters 25 and 26. These filters 25 and 26 are arranged to impose band restriction in the vertical direction of the picture plane for the purpose of a line sequential process. The outputs of these filters 25 and 26 are line serialized with the connecting position of a switch 27 arranged to be shifted at every horizontal scanning period. The line sequential color difference signals thus obtained are time-base compressed to ⅕ by a ⅕ time-base compression circuit 30. Meanwhile, the luminance signal Y is supplied via an A/D converter 28 to a ⅘ time-base compression circuit 29 to be time-base compressed ⅘ there. The time-base compressed luminance signal and the line sequential color difference signals are selectively produced by a switch 31 thus to obtain a video signal as shown in FIG. 4(A).

In the rearranging circuit 2, therefore, positions within the field memory are shifted such that the color difference signal CN of a line 2i-1 is rearranged on a line i and the color difference signal CW of a line 2i rearranged on a line (j+i), wherein "i" represents an integer between 1 and j.

Again referring to FIG. 2, the video signal which is obtained in the above-stated manner is subjected to an information signal compressing process which is performed as follows: the data produced from the rearranging circuit 2 is supplied to a memory 4, a C mode data generating circuit 5 and a mode discrimination circuit 6.

As the C mode data generating circuit 5, a thinning-out process is performed as shown in FIG. 3, upon receipt of the data. Transmission data for one field is then stored at a memory 36. At the same time, the other memory 4 stores the whole picture element data for one field. Meanwhile, on the basis of the data of the mode C, an interpolation circuit 35 computes interpolation data corresponding to the thinned out data. The interpolation data thus obtained is supplied to the mode discrimination circuit 6. The circuit 6 computes a difference between the actual picture element data and the interpolation data. The difference (a distortion value) is thus checked for every picture element block. The difference values thus obtained are stored at a distortion value memory which is not shown but is arranged within the mode discrimination circuit 6. Then, before arrival of data for a next field, the distribution of the distortion values of all the picture element blocks is obtained. Further, in order to make unvarying the transmission time required in transmitting the video signal for each field, the ratio between the number of picture element blocks to be transmitted in the mode C and that of picture element blocks to be transmitted in the mode E must be predetermined. Assuming that the modes C and E are in the ratio ⅔ to ⅓, the overall compression rate of the information signal can be expressed as (⅔×¼+1×⅓=)½. Therefore, for the purpose of determining a distortion value to be used as a boudary of allocation between the mode C and the mode E, a distortion threshold value is predetermined.

The distortion values which are stored at the distortion value memory are read out one after another at a timing for producing a video signal for a next field. Then, the distortion value thus read out is compared with the predetermined distortion threshold value for determining the transmission mode. A transmission mode information signal is then produced according to the transmission mode thus determined. The data transmission is performed in the mode C and the mode E in the above-stated predetermined ratio when the distortion value thus read out coincides with the distortion threshold value.

The switch 7 is arranged to be connected to one terminal C thereof for the first half of each field period and to the other terminal E for the latter half of the field period. In other words, all the mode C data on one picture plane is read out from the memory 36 during the first half of each field period and is produced from the switch 7. In this instance, since the compressed ratio of the whole information signal is ½ while the compressing ratio of the mode C is ¼, the mode C data of the whole picture plane is completely read out during the ½ period of each field with the data arranged to be transmitted at equal intervals.

Next, in a picture element block designated to be in the mode E, the data which is not in the mode C is read out from the memory 4 and is produced from the switch 7 during the ½ period of the latter half of each field. With the data which is not in the mode C thus solely transmitted, the remaining data is completely read out during a ½ period of one field because the compression ratio is ¾ and the allocated ratio of the picture element blocks in the mode E is ⅓. The data is read out in the following manner: the transmission mode information signal produced from the mode discrimination circuit 6 is stored at the memory 37. Then, with the transmission mode information signal read out from the memory 37, an address control circuit 38 is driven to designate a reading address of the memory 4 according to the transmission mode information signal read out.

The data produced from the switch 7 is converted back into an analog signal by a digital-to-analog (D/A) converter 8. The analog signal thus obtained undergoes a band limiting process carried out by a low-pass filter (LPF) 9. The output of the LPF 9 is supplied to a frequency modulation circuit 10. Meanwhile, the transmission mode information signal produced from the mode discrimination circuit 6 is digital modulated by a digital modulation circuit 12 through, for example, a known MFM or BPM modulation process and is then supplied to a multiplier 13. At the multiplier 13, a carrier signal which is produced from a carrier signal generating circuit 14 is modulated by the digital-modulated transmission mode information signal. Assuming that the number of picture elements of the picture plane for one field is 900×240 and the number of picture elements included in each picture element block is 4×4, the number of picture element blocks included in the picture plane for one field is 225×60. Then, the frequency of the transmission mode information signal becomes (225×60×60=) 910 KHz. Accordingly, the frequency of the carrier signal produced from the carrier signal generating circuit 14 is arranged to be 2 to 3 MHz or thereabout. The cut-off frequency of a high-pass filter (HPF) 11 is arranged to be 1.5 MHz or thereabout. Then, this arrangement permits an adder 15 to perform a frequency multiplexing operation on the modulated transmission mode information signal produced from the multiplier 13 and the frequency modulated video signal produced from the HPF 11.

The output signal of the adder 15 is supplied via an amplifier 16 to a rotary magnetic head 17 and is thus recorded on a magnetic tape 18.

Figure 6:
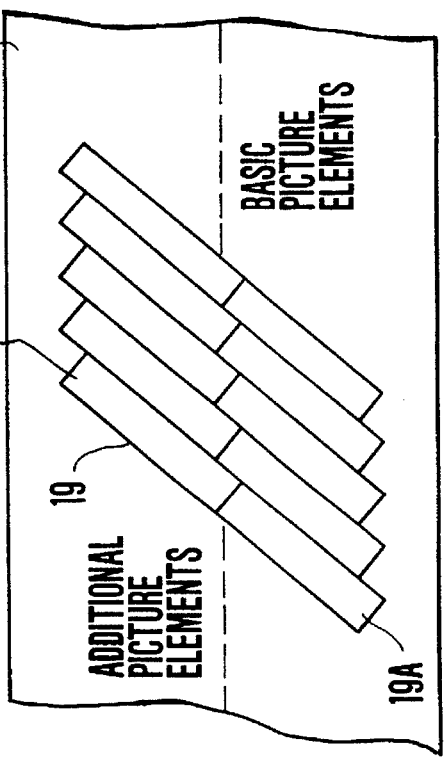
FIG. 6 is an illustration of a manner in which the information signal recording system of FIG. 2 performs recording on a recording medium.

FIG. 6 schematically shows a manner in which the signal is recorded on the magnetic tape. As shown, the signal is recorded in helical recording tracks 19 in the same manner as in the conventional home video tape recorders. In FIG. 6, a reference numeral 19A denotes a mode C data recording area, i.e., an area for recording basic picture elements. Another numeral 19B denotes an area in which remaining data other than the mode C data, i.e., data of picture element blocks designated as in the mode E (additional picture elements) is to be recorded.

Figure 7:
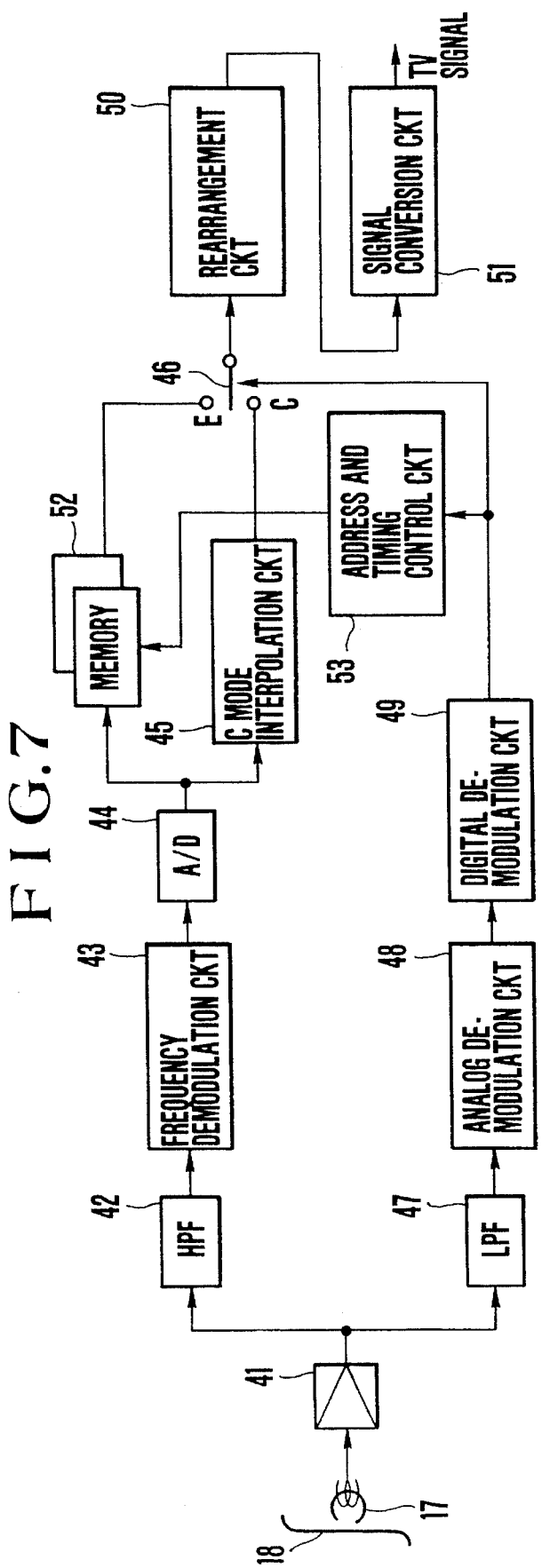
FIG. 7 is a block diagram showing by way of example the arrangement of a reproducing system of an information signal recording system arranged as an embodiment of this invention.

FIG. 7 shows in outline the arrangement of a reproduction system included in the recording and reproducing system of this embodiment. A reproduced signal obtained by the head 17 from the magnetic recording tape 18 is amplified by a reproduction amplifier 41. The amplified signal is supplied to an HPF 42 and an LPF 47. A frequency modulated video signal is separated at the HPF 42 and then is frequency demodulated at a frequency demodulation circuit 43. The demodulated video signal is brought back into a digital signal at an A/D converter 44. The output of the A/D converter 44 is supplied to a C mode interpolation circuit 45. At the circuit 45, proximate interpolation data which corresponds to the data X shown in the part C of FIG. 3 is computed by using the transmission data of the mode C for the whole picture plane. The proximate interpolation data thus obtained is stored at a memory which is not shown but is included in the C mode interpolation circuit 45.

Meanwhile, the modulated transmission mode information signal is separated at an LPF 47. The output of the LPF 47 is supplied via analog and digital demodulation circuits 48 and 49 to an address and timing control circuit 53 and is also supplied to a switch 46 for controlling the switch. All the mode C data and interpolation data corresponding to one field portion of the video signal are read out one after another from the above-stated memory included in the C mode interpolation circuit 45. All the picture element data that is necessary for restoring the video signal to its original state thus can be obtained even through this process alone.

The remaining picture elements designated as in the mode E is stored at a memory 52 together with the basic picture element data of the picture element blocks designated to be in the mode E. In this instance, the writing-in addresses are controlled by the above-stated address and timing control circuit 53. Then, the whole picture element data produced from the C mode interpolation circuit 45 and the mode E data stored at the memory 52 are supplied to the switch 46 which is controlled by the address and timing control circuit 53 according to the transmission mode information signal. The switch 46 produces the picture element data coming from the memory 52 when the transmission mode information signal is in the mode E and the picture element data coming from the C mode interpolation circuit 45 when the signal is in the mode C. In case that the reproduced transmission mode information signal teems with errors, the switch 46 is constantly connected to the terminal C thereof. In that instance, an amount of picture element data for one picture plane is stored gradually at a memory provided within a rearrangement circuit 50 in a manner as shown in FIG. 4(B). At the rearrangement circuit 50, the memory is controlled to have the data which is received in the order of FIG. 4(B) produced in the order as shown in FIG. 4(A). The data produced from the rearrangement circuit 50 is supplied to a signal conversion circuit 51. The circuit 51 then processes the incoming data into the original NTSC signal.

Figure 8:
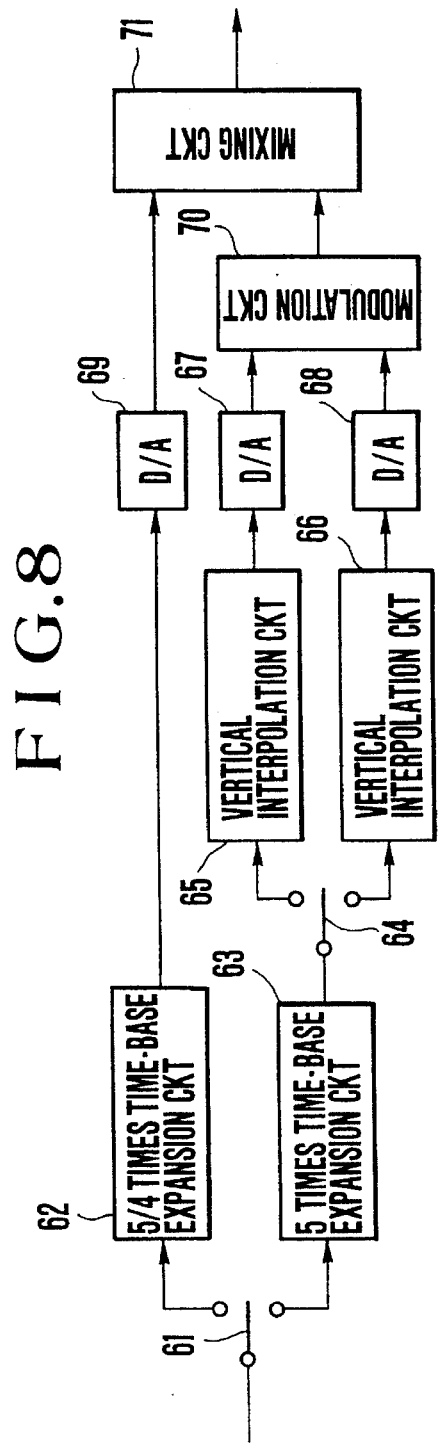
FIG. 8 is a block diagram showing by way of example the arrangement of the signal conversion circuit of the system of FIG. 7.

FIG. 8 shows by way of example the details of the above-stated signal conversion circuit 51 of FIG. 7. Among the data produced from the rearrangement circuit 50, the picture element data of the luminance signal Y is supplied via a switch 61 to a ⁵⁄₄ times time-base expansion circuit 62. The picture element data of the line sequential color difference signals CN and CW are supplied via the switch 61 to a 5 times time-base expansion circuit 63. These circuits 62 and 63 are arranged to produce their outputs at the same timing for the same horizontal scanning line.

The picture element data of the line sequential color difference signals CN and CW which are produced from the 5 times expansion circuit 63 are separated from each other by a switch 64 to be supplied to vertical interpolation circuits 65 and 66 respectively. These circuits 65 and 66 are arranged to generate data for lines having no color difference signals CN and CW through interpolation processes respectively. D/A converters 67, 68 and 69 are arranged to convert the picture element data of the signals CN, CW and Y into analog signals. The signals CN and CW which are thus restored to their original states are supplied to a modulation circuit 70 to be modulated into the original chrominance signal. The chrominance signal thus obtained is mixed with the restored luminance signal at a mixing circuit 71. As a result, the mixing circuit 71 produces a restored NTSC signal.

The TV signal recording and reproducing system which is arranged according to this invention as mentioned above is capable of reproducing or restoring at least the data of the mode C, i.e., the basic picture element data even in the event of failure to reproduce the transmission mode information signal or when the transmission mode information signal happens to be teeming with errors. Therefore, the interpolation process can be carried out by using the basic picture element data even under such a condition. The arrangement of this embodiment thus effectively prevents the reproduced picture from extremely degrading in picture quality.

In the specific embodiment described, two transmission modes E and C are arranged. However, the number of modes may be changed to be three or more. The transmission mode information signal is arranged to be recorded by frequency multiplexing together with the compressed video signal. This arrangement may be changed to record it in some area on the magnetic tape other than the area in which the compressed video signal is recorded.

The TV signal recording and reproducing system embodying this invention is arranged to record information by compressing it in varied compressing ratios for different data groups each bearing a predetermined amount of information and is capable of giving adequately reproduced information even in the event of a poor S/N ratio of the recording and reproducing system.

What is claimed is:

1. An image data recording apparatus, comprising:
   (a) blocking means for outputting input image data in a block composed of a plurality of image elements,
   (b) data reducing means for reducing the amount of the block data, said means being capable of performing plural reducing methods,
   (c) means for adding data indicating a data reducing method to the image data obtained by each of the data reducing methods, and
   (d) recording means for recording each of the image data obtained by each of the data reducing methods on different areas on a recording medium.

2. An apparatus according to claim 1, wherein said data reducing means includes a sampling circuit.

3. An apparatus according to claim 1, wherein said recording medium includes a magnetic tape.

4. An apparatus according to claim 1, wherein said recording means includes a rotary magnetic head.

5. An image data recording apparatus, comprising:
   (a) blocking means for outputting input image data in a block composed of a plurality of image elements,
   (b) data reducing means for reducing the amount of the block data, said data reducing means outputting at least first image data and second image data reduced by different data reducing methods,
   (c) means for adding data representing the data reducing method to the first and second image data, and
   (d) recording means for recording the first image data and the second image data on different areas on a recording medium.

6. An apparatus according to claim 5, wherein said data reducing means includes a sampling circuit.

7. An apparatus according to claim 6, wherein said recording means includes a rotary magnetic head.

8. An apparatus according to claim 5, wherein said first image data includes minimum main image data required for restoring the block.

9. An apparatus according to claim 5, wherein said recording medium includes a magnetic tape.

10. An image data recording apparatus, comprising:
    (a) input means for receiving image data,
    (b) processing means for reducing the amount of the image data,
        said processing means outputting at least a first image data and a second image data reduced by different data reducing methods,
    (c) output means for time-dividedly outputting the first and second image data,
    (d) means for adding data representing the data reducing method to the first and second image data, and
    (e) recording means for recording at least the first image data separately from the second image data on a different area on a recording medium.

11. An apparatus according to claim 10, wherein said first image data includes minimum main image data required for restoring the input image data.

12. An apparatus according to claim 10, wherein said processing means includes a sampling circuit.

13. An apparatus according to claim 10, wherein said processing means produces the first and second image data in a predetermined ratio so as to achieve a data amount which enables data outputting in a television rate.

14. A method for recording image data, comprising:
    (a) a first step of outputting input image data in a block composed of a plurality of image elements,
    (b) a second step of reducing the data amount of each block by a different data reducing method from each other,
    (c) a third step of adding data indicating a data reducing method to the image data reduced by a data reducing method, and
    (d) a fourth step of recording the image data reduced by each data reducing method on a different area of a recording medium from each other.

15. A method according to claim 14, wherein said data reducing method includes a sampling method.

16. A method according to claim 14, wherein in said third step each image data is recorded on a different area on a magnetic tape from each other by a rotary magnetic head.

* * * * *